US 8,806,898 B2

(12) United States Patent
Han et al.

(10) Patent No.: US 8,806,898 B2
(45) Date of Patent: Aug. 19, 2014

(54) LAYOUT FOR GLASS MANUFACTURING SYSTEM, GLASS HANDLING METHOD, AND GLASS THEREFROM

(75) Inventors: Jin Han, Goyang-si (KR); Sang-Oeb Na, Seoul (KR); Yang-Han Kim, Goyang-si (KR); Woo-Hyun Kim, Dongducheon-si (KR); Heui-Joon Park, Incheon (KR)

(73) Assignee: LG Chem, Ltd., Seoul (KR)

( * ) Notice: Subject to any disclaimer, the term of this patent is extended or adjusted under 35 U.S.C. 154(b) by 140 days.

(21) Appl. No.: 13/022,461

(22) Filed: Feb. 7, 2011

(65) Prior Publication Data

US 2011/0195254 A1 Aug. 11, 2011

(30) Foreign Application Priority Data

Feb. 9, 2010 (KR) .................. 10-2010-0011912

(51) Int. Cl.
*C03B 18/02* (2006.01)
*C03B 18/14* (2006.01)
*C03C 15/00* (2006.01)

(52) U.S. Cl.
USPC .................. 65/182.1; 65/99.2; 65/31; 65/181; 65/29.12; 65/158

(58) Field of Classification Search
USPC ...................... 65/99.1–99.6, 182.1
See application file for complete search history.

(56) References Cited

U.S. PATENT DOCUMENTS

| 3,880,633 A * | 4/1975 | Jordan et al. ................. 65/60.2 |
| 4,162,907 A * | 7/1979 | Anderson ...................... 65/29.17 |
| 4,828,900 A | 5/1989 | Mouly |
| 2002/0078710 A1* | 6/2002 | Takeuchi et al. .................. 65/31 |
| 2006/0112729 A1* | 6/2006 | Sakoske ........................... 65/106 |
| 2010/0215936 A1* | 8/2010 | Canale et al. .................. 428/220 |
| 2011/0019123 A1* | 1/2011 | Prest et al. ....................... 349/58 |

FOREIGN PATENT DOCUMENTS

| CN | 101224946 A | 7/2008 |
| JP | 2000-335925 | 12/2000 |
| JP | 2001-139348 | 5/2001 |
| JP | 2003-137574 | 5/2003 |
| JP | 2005-041726 | 2/2005 |
| JP | 2008-070324 | 3/2008 |
| WO | WO 2008/146522 | 12/2008 |

OTHER PUBLICATIONS

Kumar, "Production and Operations Management", New Age International Publishers, pp. 42-51, 2006.*

(Continued)

*Primary Examiner* — Matthew Daniels
*Assistant Examiner* — Lisa Herring
(74) *Attorney, Agent, or Firm* — McKenna, Long & Aldridge LLP

(57) ABSTRACT

An layout for a glass manufacturing system may include a hot process part having a batch plant for storing a glass raw material, a tank for melting the raw material and storing a molten glass, a float bath for forming the molten glass into a glass of a ribbon shape, an annealing lehr for cooling the glass ribbon, and a cold end connected to the annealing lehr, and an etching process part having a final cutting sector for cutting the glass provided from the cold end into sheet glasses of a preset final size, a beveling and etching sector for bevel the edges of the cut sheet glasses and etching the beveled sheet glasses, and a first inspection sector for inspecting the etched sheet glasses, and the hot process part and the etching process part may be connected by a single conveyor to form a continuous line.

8 Claims, 6 Drawing Sheets

(56) References Cited

OTHER PUBLICATIONS

Al-Khayyal et al., "Solution of a large-scale two-stage decision and scheduling problem using decomposition", European Journal of Operational Research, pp. 453-465, 2001.*

Sandia, "Glass Furnace Combusion and Melting Research Facility", Sandia Report SAND2004-008, Aug. 2004.*

CN101224946 Machine Translation performed Apr. 2, 2014 ProQuest Dialog.*

* cited by examiner

LAYOUT FOR GLASS MANUFACTURING SYSTEM, GLASS HANDLING METHOD, AND GLASS THEREFROM

CROSS-REFERENCE TO RELATED APPLICATION

This application claims priority to Korean Patent Application No. 10-2010-0011912 filed in Republic of Korea on Feb. 9, 2010, the entire contents of which are incorporated herein by reference.

BACKGROUND OF THE INVENTION

1. Field of the Invention

The present invention relates to a layout for a glass manufacturing system, a glass handling method, and a glass therefrom, and more particularly, to a layout for a glass manufacturing system, which may improve a distribution flow and increase a factory site utilization by reducing the number of steps (including, for example, packing, unloading, and the like) from a hot process to shipping of products in the manufacture of a glass by a float process and by optimizing a manufacturing process in a continuous line, and a glass handling method and a glass therefrom.

2. Description of the Related Art

Generally, a glass manufacturing system using a float process makes a glass by forming a glass of a ribbon shape with predetermined width and thickness while continuously supplying a molten glass onto a molten metal stored in a float bath and advancing the molten glass floating above the molten metal.

Here, the molten metal includes, for example, molten tin or molten tin alloy, and has a larger specific gravity than the molten glass. The molten metal is received in the float bath filled with reducing hydrogen ($H_2$) and/or nitrogen ($N_2$) gas. Also, the float bath receiving the molten metal has a horizontally elongated structure in which special refractory material is embedded. The molten glass is formed into a glass of a ribbon shape on the surface of the molten metal while moving from an upstream of the float bath to a downstream. Then, the glass is moved to an annealing lehr.

FIG. 1 is a schematic view illustrating a layout for a conventional glass manufacturing system by a float process, and a structure and a function of each floor of a factory building for each process.

Referring to FIG. 1, the layout 1 for the system for manufacturing and handling a glass for a thin film transistor liquid crystal display (TFT-LCD) includes a first factory building 10 where a hot process 12 for loading a glass raw material and forming a float glass of a ribbon shape is performed, and a second factory building 20 where a first handling process 22 for etching the glass and a second handling process 32 for polishing the glass are performed.

The hot process 12 includes loading a raw material in a batch plant 11, melting the raw material in a tank 13, and forming a glass of a ribbon shape while passing the raw material through a float bath 15. In the hot process 12, the glass ribbon is passed through an impurity inspector (not shown) and is automatically designed based on a preset size. Also, in the hot process 12, the glass ribbon is cut in a widthwise direction and a lengthwise direction based on a design, and is gone through a packing step 19. A semi-product packed in the hot process 12 is moved to the second factory building 20 by an off-line transfer means (not shown). Generally, an equipment related to the hot process 12 is installed in the second floor of the first factory building 10, and a variety of pipes, a cooling fan, a conveyor for treating a glass fraction, and the like, are installed in the first floor of the first factory building 10.

To put the glass of a semi-product type in the first handling process 22, a paper used to pack the glass in the packing step 19 of the hot process 12 is removed, and each glass is unloaded using a robot system (not shown). Then, the unloaded glass of a semi-product type is gone through a final cutting step 23, a beveling step 25, an etching step 27, an inspection step 29, and a second packing step 24. After the second packing step 24, the glass is moved to the second handling process 32.

The second handling process 32 includes unloading 31 of the glass packed in the first handling process 22, a polishing step 33 for polishing the surface of the glass using a polishing machine (not shown), a cleaning step 35 for cleaning the polished glass, a final inspection step 37, a final packing step 39, and shipping of the packed glass. The shipped glass as a final product may be provided to a panel manufacturer.

However, the conventional glass manufacturing process and the layout 1 for the conventional glass manufacturing system have inconvenience of inserting and removing a packing paper two times, unloading a glass two times, and packing a glass three times. As a result, the layout 1 for the conventional glass manufacturing system causes problems, for example, loss of quality related to packing, and consumption of excessive operating costs such as costs for packing papers, labor costs, costs for maintenance and repair, and investment costs, and the like. Also, facilities are wasted, for example, a separate factory building for each process is used. In particular, a distribution flow is not considerably economical and productive.

SUMMARY OF THE INVENTION

The present invention is designed to solve the problems of the conventional art, and therefore, the present invention is directed to providing a layout for a glass manufacturing system, which may improve a distribution flow and increase a factory site utilization by eliminating a unnecessary step of a conventional glass manufacturing process, reducing the number of packing and unloading steps that may affect the quality of a glass product, and optimizing a manufacturing process in a continuous line, a glass handling method and a glass therefrom.

To achieve the object of the present invention, a layout for a glass manufacturing system according to an embodiment of the present invention may include a hot process part having a batch plant for storing a raw material for forming a glass, a tank for melting the glass raw material provided from the batch plant and storing a molten glass, a float bath for receiving the molten glass from the tank and forming a glass of a ribbon shape, an annealing lehr for cooling the glass ribbon formed by the float bath while passing the glass ribbon therethrough, and a cold end connected to the annealing lehr, and an etching process part having a final cutting sector for cutting the glass provided from the cold end into sheet glasses of a preset final size, the glass having been primarily cut in the cold end, a beveling and etching sector for beveling the edges of the sheet glasses and etching the beveled sheet glasses, and a first inspection sector for inspecting the etched sheet glasses, and the hot process part and the etching process part may be connected by a single conveyor to form a continuous line.

Preferably, the hot process part and the etching process part may be arranged in the second floor of one factory building.

Preferably, the etching process part may further include a first packing sector installed at the end thereof for packing the sheet glass inspected by the first inspection sector.

Preferably, the first packing sector may sort the sheet glass inspected by the first inspection sector into two quality grades, and may pack the sheet glass.

Preferably, the layout for the glass manufacturing system may further include a polishing process part positioned in the first floor of the factory building, and having a starting end connected to the end of the etching process part.

Preferably, the polishing process part may include a polishing sector for polishing at least one surface of the sheet glass using a polishing machine, a cleaning sector for cleaning the surface of the sheet glass polished by the polishing sector, and a final inspection sector for inspecting the cleaned surface of the sheet glass.

Preferably, the polishing process part may further include an unloading sector installed at the starting end thereof for unloading the sheet glass of a semi-product type packed by the first packing sector.

Preferably, the polishing process part may further include a final packing sector installed at the end thereof for finally packing the sheet glass inspected by the final inspection sector.

Preferably, the cold end may be divided into at least two side lines.

Preferably, the etching process part may have at least two lines corresponding to the plurality of side lines.

Preferably, the layout for the glass manufacturing system may further include a loading/unloading member for temporarily loading the sheet glass when an error occurs in at least one of the side lines, and for providing the sheet glass to the side lines when the side line returns to a normal state.

To achieve the object of the present invention, a glass handling method according to an embodiment of the present invention may include (a) forming a glass of a ribbon shape in a hot process part by a float process, (b) cutting the glass into sheet glasses of a preset final size in an etching process part connected to the hot process part by a conveyor, and etching the sheet glasses, the glass having been primarily cut in a cold end, and (c) polishing the sheet glasses in a polishing process part connected to the etching process part by the conveyor.

Preferably, the (a) step and the (b) step may be continuously performed in the second floor of one factory building, and the (c) step may be performed in the first floor of the factory building.

Preferably, the (b) step may include beveling the edges of the sheet glass before the etching, primarily inspecting the etched sheet glass, and primarily packing the inspected sheet glass.

Preferably, the (c) step may include polishing at least one surface of the sheet glass using a polishing machine, cleaning the polished surface of the sheet glass, and finally inspecting the cleaned surface of the sheet glass.

Preferably, the (c) step may further include a final packing step for finally packing the sheet glass inspected in the final inspection step.

Preferably, the (b) step and the (c) step may be performed in parallel in at least two side lines divided at the end of the hot process part.

Preferably, the glass handling method may further include temporarily loading the sheet glass when an error occurs in at least one of the side lines, and providing the sheet glass to the side lines when the side line returns to a normal state.

The present invention also provides a glass manufactured by the above-described method.

ADVANTAGEOUS EFFECTS

A layout for a glass manufacturing system and a glass handling method according to the present invention have the following effects.

First, a quality loss of a glass product may be minimized due to reduction in a repeated step (for example, a packing step) of a conventional process.

Second, operating costs may be reduced, such as costs for packing papers, labor costs, costs for maintenance and repair, and investment costs, and the like.

Third, a hot process, an etching process and a polishing process that were conventionally performed in each factory building, may be performed on an in-line conveyor installed in one factory building, thereby improving a distribution flow and increasing a factory site utilization.

Fourth, the width of a factory building at a cold end may be minimized. For example, the width of a factory building at a cold end according to a conventional layout was about 60 meters or more at minimum, however the width of a factory building at a cold end according to a layout of the present invention may be reduced to about 40 meters or less at maximum.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, a layout for a glass manufacturing system, a glass handling method, and a glass therefrom according to a preferred embodiment of the present invention will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
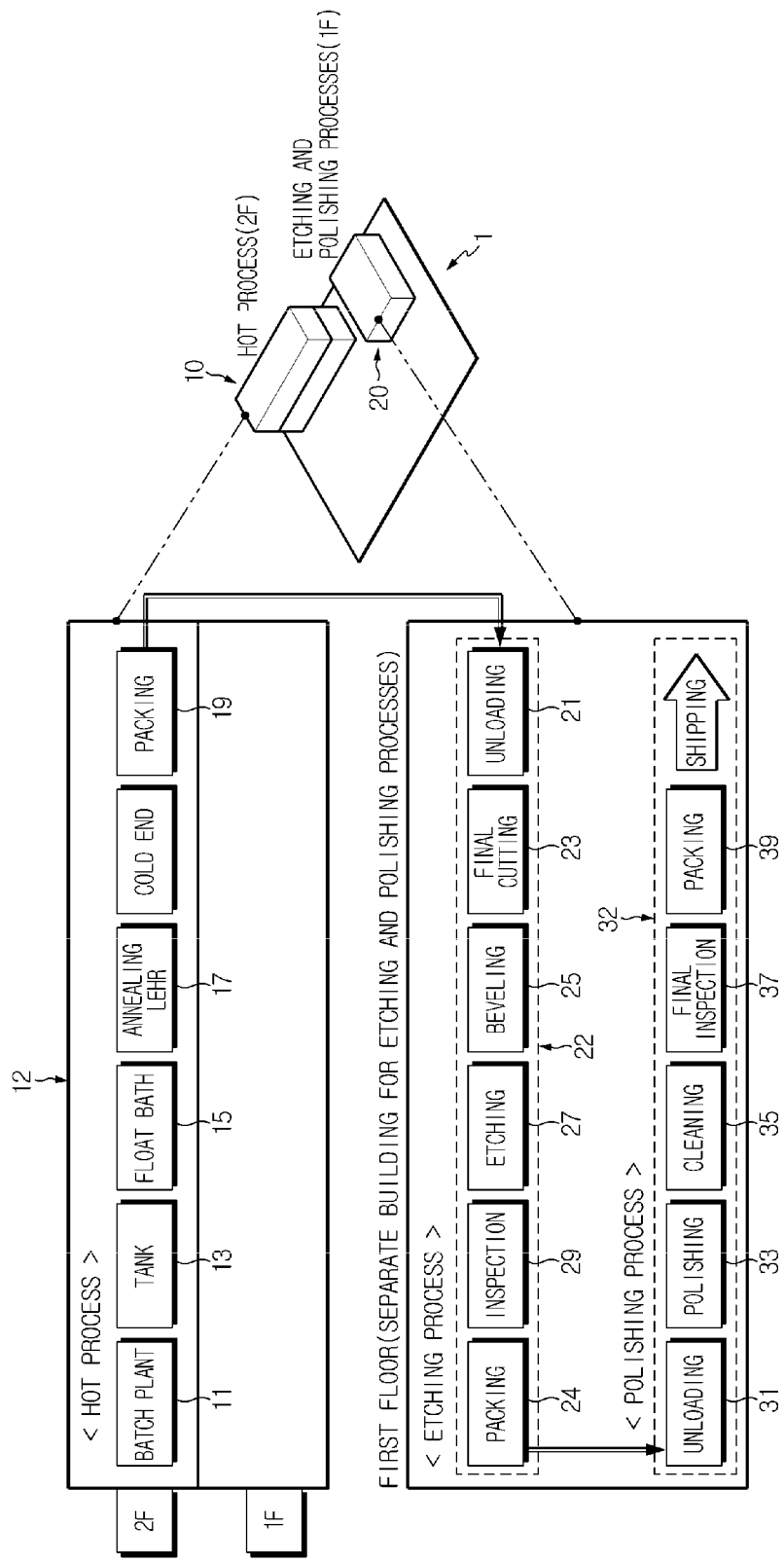
FIG. 1 is a schematic view illustrating a layout for a conventional glass manufacturing system by a float process, and a structure and a function of each floor of a factory building for each process.
Figure 2:
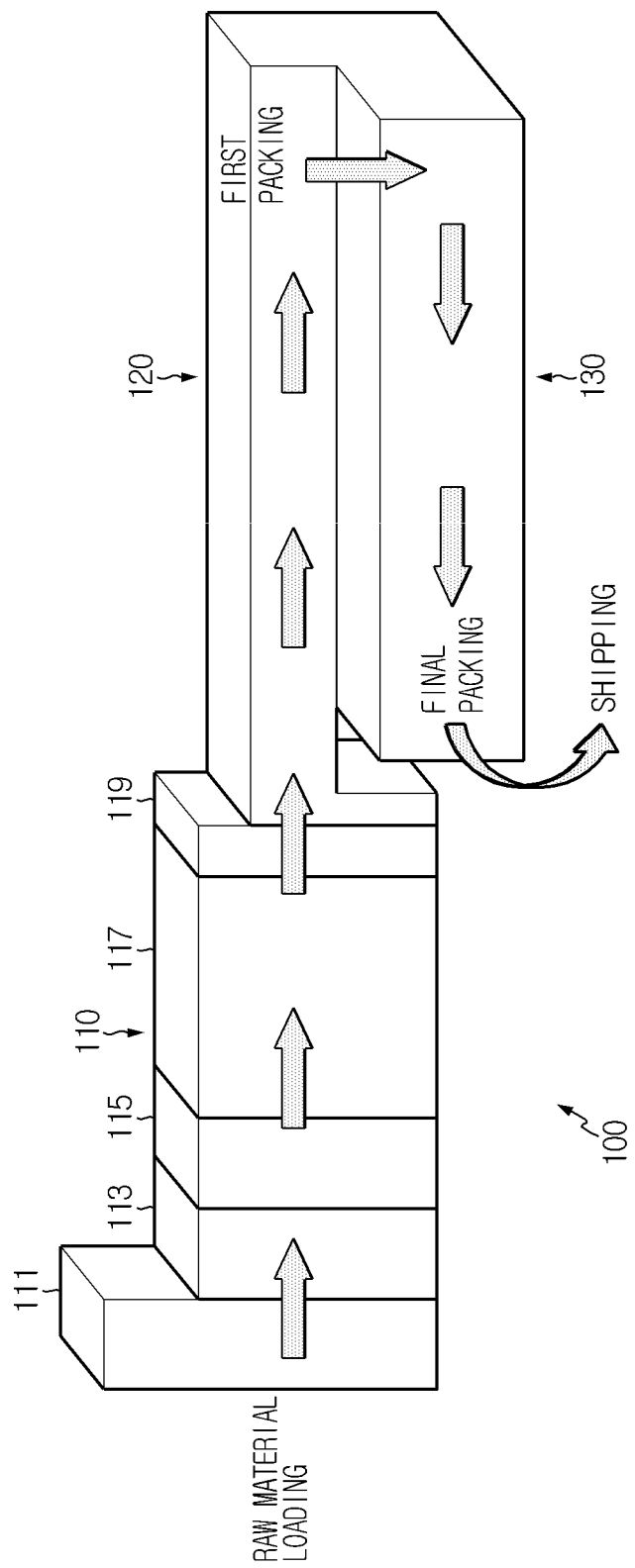
FIG. 2 is a schematic prospective view illustrating a layout for a glass manufacturing system according to a preferred embodiment of the present invention.
Figure 3:
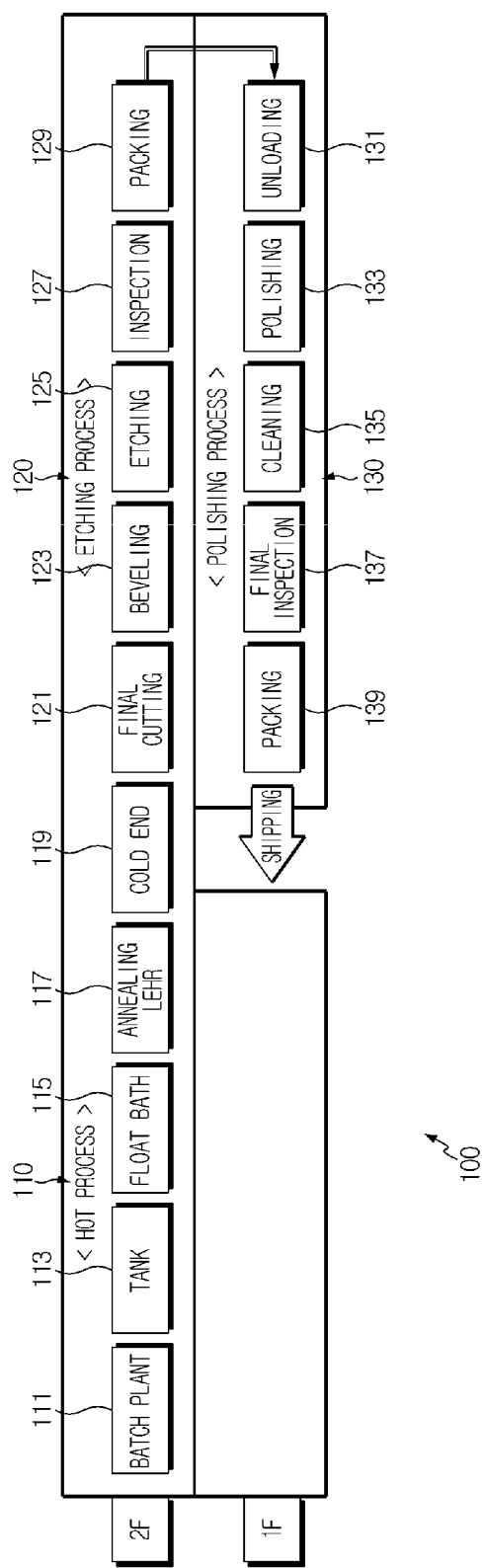
FIG. 3 is a process flow diagram illustrating a glass handling method for a glass manufacturing system according to a preferred embodiment of the present invention.

FIG. 2 is a schematic prospective view illustrating a layout for a glass manufacturing system according to a preferred embodiment of the present invention. FIG. 3 is a process flow diagram illustrating a glass handling method for a glass manufacturing system according to a preferred embodiment of the present invention.

Referring to FIGS. 2 and 3, the layout 100 for the glass manufacturing system according to a preferred embodiment of the present invention may include a hot process part 110 and an etching process part 120 in the second floor of one factory building. The hot process part 110 and an etching process part 120 may be arranged in a continuous manner by an in-line conveyor (150 of FIGS. 5 and 6). Also, the layout 100 may include a polishing process part 130 in the first floor of the factory building, and the polishing process part 130 may be connected to the etching process part 120. Arrows of FIG. 2 indicate a moving path starting from loading of a glass raw material and ending with shipping of a glass product.

The hot process part 110 may include a batch plant 111, a tank 113, a float bath 115, an annealing lehr 117, and a cold end 119 arranged in a continuous manner. The batch plant 111 may load and store a raw material for forming a glass. The tank 113 may melt a glass raw material provided from the batch plant 111 and store a molten glass. The float bath 115 may receive a molten glass from the tank 113 and form a glass of a ribbon shape. The annealing lehr 117 may cool a glass ribbon formed by the float bath 115. The cold end 119 may be provided at the end of the annealing lehr 117, and may measure the thickness or stress of a glass. The cold end 119 may have an inspection equipment for detecting a fault of a glass, a first cutting equipment, an equipment for throwing away a detective glass, and the like. The structure and working principle of the hot process part 110 are equal to those of general glass formation by a float process, and thus, their detailed description is omitted herein.

The etching process part 120 may include a final cutting sector 121, a beveling sector 123, an etching sector 125, a first inspection sector 127, and a first packing sector 129 arranged in a continuous manner. The final cutting sector 121 may cut into sheet glasses (not shown) of a preset final size, the glass (not shown) that was provided from the cold end 119, gone through a first cutting step, and moved thereto. The beveling sector 123 may bevel four edges of each sheet glass that was cut by the final cutting sector 121 and moved by the conveyor 150. The etching sector 125 may etch the beveled sheet glass. The first inspection sector 127 may inspect the beveled and etched sheet glass. The first packing sector 129 may be located at the end of the etching processing part 120, and may pack the sheet glass for preventing occurrence of breakdown or scratches in the sheet glass or introduction of impurities in the sheet glass while the sheet glass is moved from the second floor of the factory building to the first floor.

As described above, the hot process part 110 and the etching process part 120 may be connected by the conveyor 150 of a single line to form a continuous line.

The polishing process part 130 may be provided at the end of the etching process part 120, that is to say, an unloading sector 131 at a starting end of the polishing process 130 may be connected to the first packing sector 129. Preferably, the polishing process part 130 may be connected to a second floor line by a connecting transfer means such as a vertical conveyor (not shown) or an elevator.

The polishing process part 130 may include the unloading sector 131, a polishing sector 133, a cleaning sector 135, a final inspection sector 137, and a final packing sector 139 arranged in order. The unloading sector 131 may remove a paper used to pack the sheet glass by the first packing sector 129, and may load the sheet glass on a line of the polishing process part 130. The polishing sector 133 may polish at least one surface of the sheet glass using a polishing machine (not shown). The cleaning sector 135 may clean the surface of the sheet glass polished by the polishing sector 133. The final inspection sector 137 may inspect the surface of the sheet glass cleaned by the cleaning sector 135. The final packing sector 139 may be installed at the end of the polishing process part 130, and may finally pack the sheet glass inspected by the final inspection sector 137 before shipping.

Figure 4:
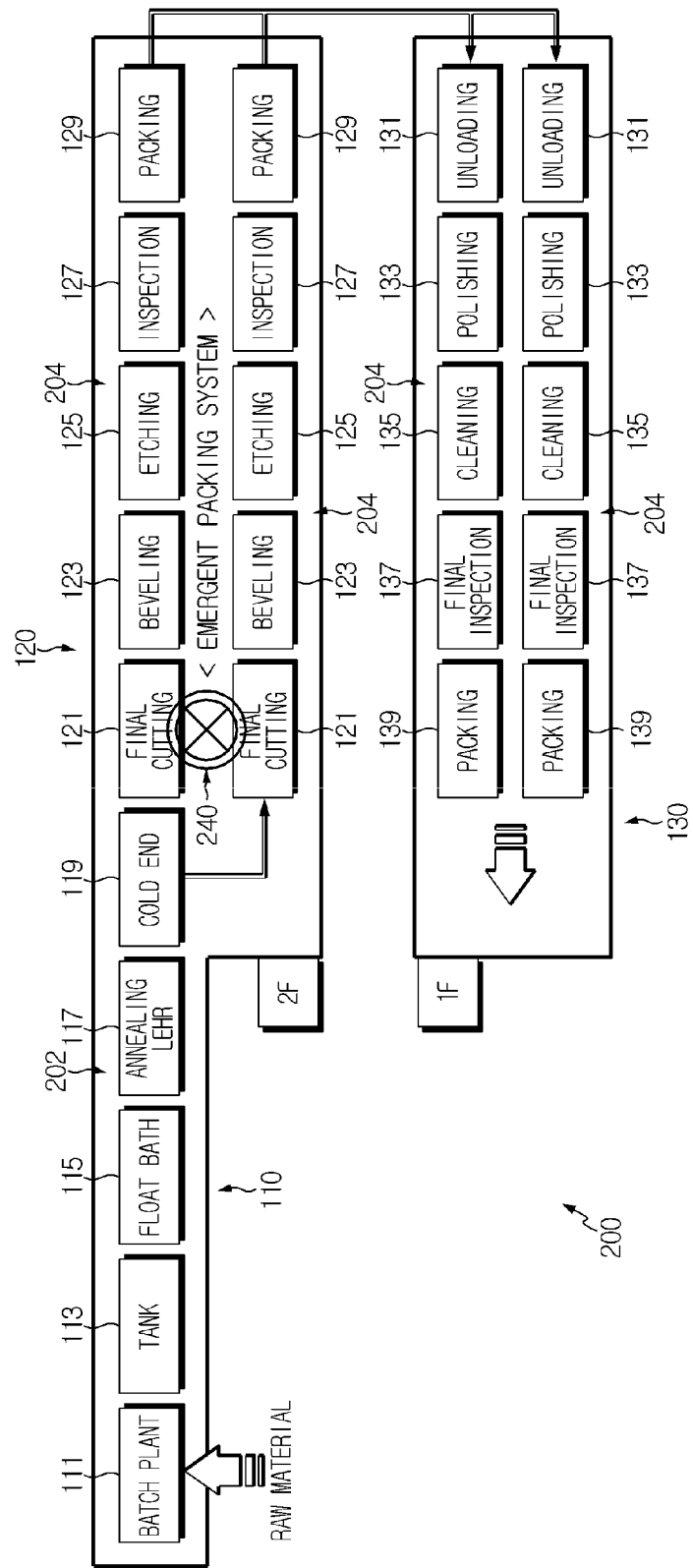
FIG. 4 is a process flow diagram illustrating a glass handling method for a glass manufacturing system according to another preferred embodiment of the present invention.

FIG. 4 is a process flow diagram illustrating a glass handling method for a glass manufacturing system according to another preferred embodiment of the present invention. Like reference numerals of FIG. 3 are used to indicate the same elements with the same functions.

Referring to FIG. 4, a layout 200 for a glass manufacturing system according to this embodiment may include a main line 202 for maintaining a glass in a ribbon shape, two side lines 204 for cutting the glass ribbon into a plurality of sheet glasses and conveying the sheet glasses, and a loading/unloading member 240 for temporarily loading the sheet glass when an error occurs in at least one of the side lines 204, and for providing the sheet glass to the side lines 204 again when the side line 204 returns to a normal state.

According to this embodiment, the main line 202 may have the same structure as the hot process part 110 of the above-described embodiment, and each of the side lines 204 may have a double parallel arrangement of the sectors of the etching process part 120 of the above-described embodiment and a double parallel arrangement of the sectors of the polishing process part 130. The detailed description of each sector is omitted herein.

The layout 200 for the glass manufacturing system has 2 side lines for the following reasons.

First, two side lines may be operated according to design and production with various sizes in the main line 202.

Second, two side lines may be used when a processing capacity with only one side line is insufficient relative to the total load of the main line 202 and an extra side line is needed.

Third, two side lines may be required when a side line of a stand-by type is needed to take precautions against an error in any one side line.

Figure 5:
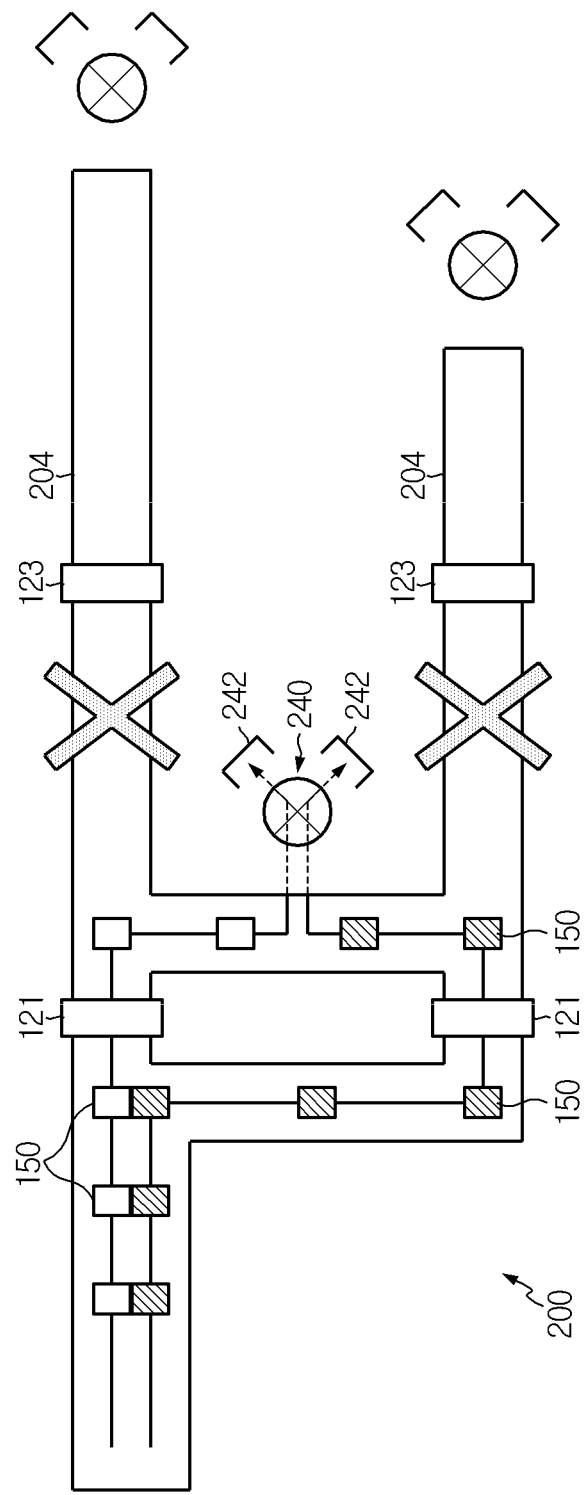
FIG. 5 is a schematic view illustrating an operation of a loading/unloading member of FIG. 4.

FIG. 5 is a schematic view illustrating an operation of the loading/unloading member 240 of FIG. 4.

Referring to FIGS. 4 and 5, when an error occurs in one of the two side lines 204, the loading/unloading member 240 may stop each of the side lines 204 (indicated as 'X' in FIG. 5), and may temporarily load, in a loading space 242, a sheet glass that was provided from the main line 202, cut by the final cutting sector 121, and moved thereto. Because the sheet glass is temporarily packed before inspection by the first inspection sector 127, packing of the sheet glass may be only based on a location of the side lines 204, that is, a left side and a right side. In FIG. 5, a box indicated on a straight line is the conveyor 150. After the side line 204 in an abnormal state returns to a normal state, the loading/unloading member 240 may provide the sheet glass loaded in the loading space 242 to the corresponding side line 204.

Figure 6:
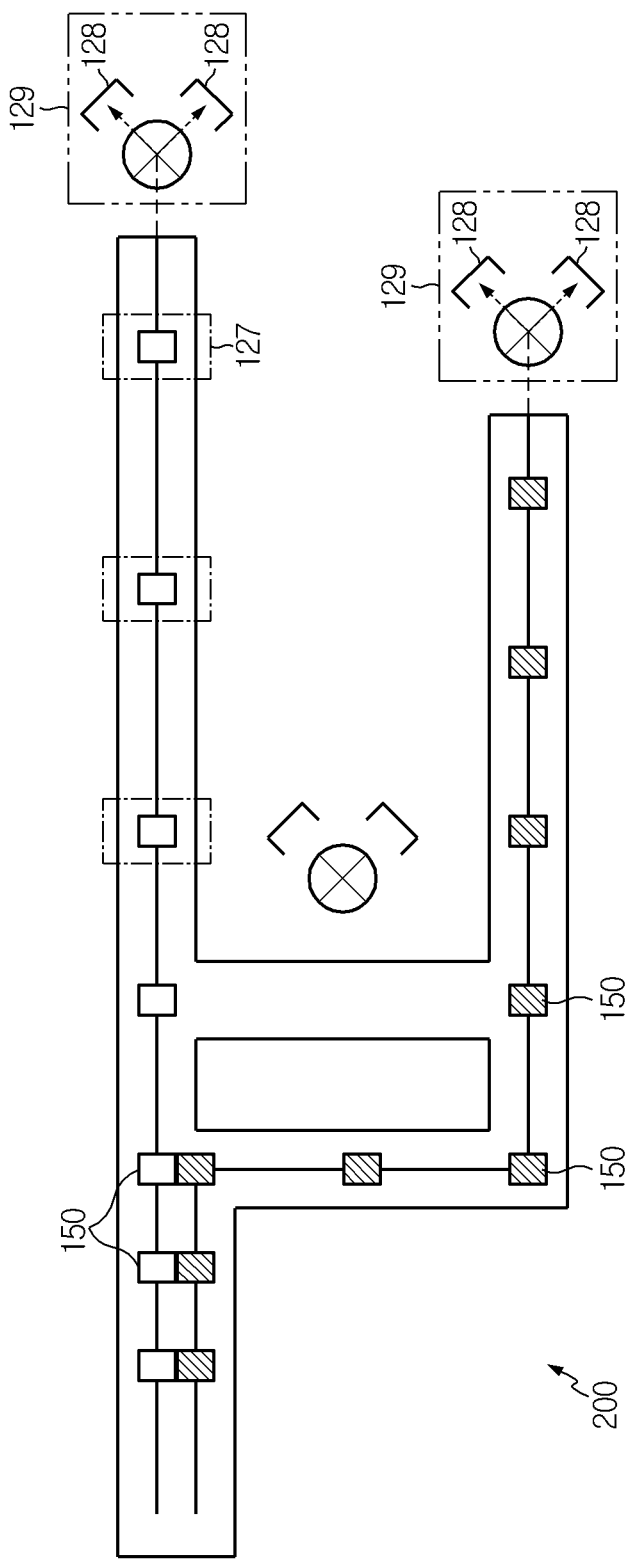
FIG. 6 is a schematic view illustrating a glass flow during operation of a first packing sector when a layout of FIG. 4 is in a normal state.

FIG. 6 is a schematic view illustrating a glass flow during operation of the first packing sector 129 when the layout 200 of FIG. 4 is in a normal state.

Referring to FIGS. 4 and 6, when the glass manufacturing system normally operates in the second floor of the factory building, the first packing sector 129 may sort the sheet glass into two quality grades depending on determination of the first inspection sector 127, and may pack the sheet glass in a tray 128 corresponding to each grade.

The present invention is not limited to the above embodiments, but suitable modifications and improvements are also possible. In addition, an order, a shape, a size, a configuration, and the number of individual sectors of the hot process part, the etching process part, and the polishing process part, and the number of side lines may be selected as desired within the available ranges if the object of the present invention can be accomplished, and not limited specially.

Hereinabove, the present invention has been described in detail with reference any specific examples and drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A layout for a glass manufacturing system, comprising:
    a hot process part including:
        a batch plant for storing a raw material for forming glass;
        a tank for melting the glass raw material provided from the batch plant and storing a molten glass;
        a float bath for receiving the molten glass from the tank and forming a glass of a ribbon shape;
        an annealing lehr for cooling the glass ribbon formed by the float bath while passing the glass ribbon therethrough; and
        a cold end connected to the annealing lehr, the cold end being divided into at least two side lines;
    an etching process part having at least two lines corresponding to the at least two side lines of the cold end, each etching process part side line including:
        a final cutting sector for cutting glass provided from the cold end into sheet glasses of a preset final size, the glass having been primarily cut;
        a beveling and etching sector for beveling the edges of the sheet glasses and etching the beveled sheet glasses; and
        a first inspection sector for inspecting the etched sheet glasses; and
    a loading/unloading member coupled with each of the at least two etching process part side lines for temporarily loading a sheet glass to a temporary loading space when an error occurs in at least one of the etching process part side lines, and for returning the sheet glass to the error-occurred etching process part side lines when the etching process part side lines return to a normal state,
    wherein the hot process part and the etching process part are connected by a single conveyor to form a continuous line.

2. The layout for the glass manufacturing system according to claim 1, wherein the hot process part and the etching process part are arranged in the second floor of one factory building.

3. The layout for the glass manufacturing system according to claim 1, wherein the etching process part further includes a first packing sector installed at the end thereof for packing the sheet glass inspected by the first inspection sector.

4. The layout for the glass manufacturing system according to claim 3, wherein the first packing sector sorts the sheet glass inspected by the first inspection sector into two quality grades, and packs the sheet glass.

5. The layout for the glass manufacturing system according to claim 3, further comprising:
    a polishing process part positioned in the first floor of the factory building, and having a starting end connected to the end of the etching process part.

6. The layout for the glass manufacturing system according to claim 5, wherein the polishing process part includes:
    a polishing sector for polishing at least one surface of the sheet glass using a polishing machine;
    a cleaning sector for cleaning the surface of the sheet glass polished by the polishing sector; and
    a final inspection sector for inspecting the cleaned surface of the sheet glass.

7. The layout for the glass manufacturing system according to claim 6, wherein the polishing process part further includes an unloading sector installed at the starting end thereof for unloading the sheet glass of a semi-product type packed by the first packing sector.

8. The layout for the glass manufacturing system according to claim 6, wherein the polishing process part further includes a final packing sector installed at the end thereof for finally packing the sheet glass inspected by the final inspection sector.

* * * * *